United States Patent
Raaf

(10) Patent No.: US 7,251,266 B2
(45) Date of Patent: Jul. 31, 2007

(54) METHOD FOR DETERMINING THE AMPLIFICATION FACTORS OF A DATA CHANNEL AND OF A CONTROL CHANNEL OF A DATA TRANSMISSION SYSTEM

(75) Inventor: Bernhard Raaf, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 682 days.

(21) Appl. No.: 10/276,008

(22) PCT Filed: May 17, 2001

(86) PCT No.: PCT/EP01/05681

§ 371 (c)(1),
(2), (4) Date: Nov. 12, 2002

(87) PCT Pub. No.: WO01/91321

PCT Pub. Date: Nov. 29, 2001

(65) Prior Publication Data

US 2003/0142979 A1    Jul. 31, 2003

(51) Int. Cl.
*H04B 1/00*  (2006.01)
*H04B 7/216*  (2006.01)
*H04L 12/56*  (2006.01)

(52) U.S. Cl. ............ 375/146; 375/130; 370/335; 370/441

(58) Field of Classification Search ........ 375/295, 375/130, 146, 149; 370/320, 331, 335, 342, 370/441, 479, 336, 347, 318; 455/422, 436, 455/439, 522, 101–105, 67.11, 67.13, 295
See application file for complete search history.

(56) References Cited

FOREIGN PATENT DOCUMENTS

| EP | 0 881 786 | 12/1998 |
|---|---|---|
| WO | WO 99/56410 | 11/1999 |

OTHER PUBLICATIONS

Nokia "DPDCH/DPCCH gain factors" TSG-RAN Working Group 1, meeting 12, Apr. 10-13, 2000.*
Universal Mobile Telecommunications System (UMTS); Physical layer procedures (FDD) 1999.
ERCISSON: Amplitude differences between upling DPCCH and DPDCH TSG-RAN Working Group 1 Meeting 4, Apr. 18, 1999.
$3^{rd}$ Generation Partnership Project; Technical Specification Group Radio Access Network; Physical layer procedures (FDD) 1999.

* cited by examiner

*Primary Examiner*—Mohammed Ghayour
*Assistant Examiner*—Sophia Vlahos
(74) *Attorney, Agent, or Firm*—Bell, Boyd & Lloyd LLP

(57) ABSTRACT

A method is provided for determining the amplification factors both of a data channel and of a controlled channel of a data transmission system, wherein the data transmission is performed in a normal mode or a compression mode, a nominal ratio is calculated in the normal mode from signaled reference amplification factors, and further amplification factors are determined therefrom via rounding or discretization, and a corrected nominal ratio is calculated from the nominal ratio in the compression mode, and amplification factors are determined therefrom via rounding or discretization.

3 Claims, No Drawings

METHOD FOR DETERMINING THE AMPLIFICATION FACTORS OF A DATA CHANNEL AND OF A CONTROL CHANNEL OF A DATA TRANSMISSION SYSTEM

BACKGROUND OF THE INVENTION

The present invention relates to a method for determining the amplification factors both of a data channel and of a control channel of a data transmission system; in particular, a mobile radio system.

A method for data transmission with interruption phases is known from WO99/56410. This document discloses a method for data transmission in a communication system, particularly a CDMA mobile radio system, the data being transmitted in a structured fashion in frames, and a transmitting station transmitting the data in such a way that it is possible for a receiver station receiving the data to execute other functions during one or more interruption phases in which it interrupts the reception and/or the processing of received data; in particular, to carry out measurements via a receiving device. In this case, data (for example, voice data, image data or system data) are transmitted between transmitting stations and receiver stations on transmission links; for example, with the aid of electromagnetic waves via an air or radio interface. The data transmitted during transmission are structured in this case into frames which, for their part, are subdivided again into slots which have a prescribed length in each case. Particularly in the case of different services such as voice data transmission and video data transmission, the frames also can have a different structure and length. In communication systems in which there is essentially continuous transmission between a transmitting station and a receiver station, the receiver station occasionally also must execute functions other than data reception, which cannot be executed simultaneously, at least during operation of only a single receiving device. In particular, the mobile station in a cellularly constructed mobile radio communication system in which the base stations of different cells transmit on different frequencies must measure from time to time whether it can receive radio signals from another base station with a good reception quality. For this purpose, the mobile station sets up its receiving device on a different frequency from the frequency on which it is currently receiving data. In order to be able to transmit from the base station to the mobile station without interruption, it is known therefrom that the transmitting station interrupts the transmission at prescribed times in order to permit the receiver station to carry out an adjacent-channel search via its single receiving device. In order to avoid a data loss, the base station (transmitting station) transmits the data previously or thereafter, in a so-called compression mode, at a higher transmission rate than the substantially constant steady transmission rate in this so-called normal mode. So that this does not lead to higher bit error rates (BER), the transmit power additionally can be raised during this time. In the uplink as well, that is to say for the data that are transmitted from the mobile station to the base station, it is necessary in a similar way to insert such an interruption phase at prescribed times; in particular, when the mobile station is equipped only with a synthesizer which is used for generating both the receive frequency and the transmit frequency. In order to avoid a data loss, the mobile station (transmitting station) then also transmits the data previously or thereafter, in a so-called compression mode, at a higher transmitting rate than the substantially constant steady transmitting rate in the so-called normal mode. So that this does not lead to higher bit error rates (BER), it is additionally possible for the transmit power to be raised during this time.

The following method for determining the amplification factors of a data channel DPDCH (Dedicated Physical Data Channel) and a control channel DPCCH (Dedicated Physical Control Channel) is known from "3rd Generation Partnership Project; Technical Specification Group Radio Access Network; Physical layer procedures (FDD), 3G TS 25.214 V3.2.0 (2000-03) (Release 1999), in particular Section 5.1.2.5". Data channels and control channels are based, in this case, on a mapping of physical transmission resources onto logic channels via multiplex methods known per se such as, for example, TDMA, FDMA or CDMA. Provided for the purpose of describing the services and data transmitted by the data channels are so-called transport format combinations TFC which, accordingly, specify the data rate required therefor, the coding method provided therefor and/or the transmission quality required therefor. In order to meet these requirements, the amplification factors $\beta_c$ (amplification factor for control channel) and $\beta_d$ (amplification factor for data channel) are appropriately matched to the respective TFCs in a mobile station. The power of the control channel is regulated in this case by power setting information such that the received power at the base station remains substantially constant despite varying channel properties. The power of the data channel is matched to the requirements of the various TFCs; this is performed by virtue of the fact that the amplitude ratio between the data and control channels is set by the ratio of the amplification factors, that is to say by $\beta_d/\beta_c$. The amplification factors are defined in this case such that they can be set by a limited number of bits. In the signal processing, the signal stream for the data and control channels is typically multiplied by these amplification factors, and the amplification ratio is thereby achieved. This multiplier can be implemented cost-effectively by the limitation to a low bit number. These amplification factors therefore also can be understood as amplitude amplification factors. On the other hand, this procedure has the disadvantage that the power can be set only with a certain quantization that follows from the bit width.

The following two methods for controlling the amplification factors of the data channel (DPDCH) and the control channel (DPCCH) are provided in the normal mode:

$\beta_c$ and $\beta_d$ are signaled to the mobile station for the respective TFC, or $\beta_3$ and $\beta_d$ are calculated in the mobile station for the respective TFC on the basis of signaled reference amplification factors $\beta_{c,ref}$, $\beta_{d,ref}$ which are directly valid for another TFC.

If the amplification factors $\beta_c$ and $\beta_d$ are signaled, these signaled amplification factors are used in the normal mode directly for setting the amplitude ratio between the DPCCH and the DPDCHs.

If the amplification factors $\beta_c$ and $\beta_d$ are calculated in the normal mode for specific TFCs from signaled reference amplification factors, a nominal ratio $A_j$ is thus calculated using the following relationship:

$$A_j = \frac{\beta_{d,ref}}{\beta_{c,ref}} \cdot \sqrt{\frac{L_{ref}}{L_j} \sqrt{\frac{K_j}{K_{ref}}}}, \text{ wherein}$$

$\beta_{c,ref}$, $\beta_{d,ref}$: are signaled reference amplification factors for the reference TFC; $\beta_{c,j}$, $\beta_{d,j}$: are amplification factors for the jth TFC; $L_{ref}$ is the number of the DPDCHs used for the reference TFC; $L_j$: is the number of the DPDCHs used for the jth TFC; $K_{ref}$: is a measure of power demand per DPDCH of the reference TFC, which essentially takes account of the data rates, coding gains and transmission quality requirements of the data streams jointly transmitted in the relevant TFC; $K_j$: is a measure of power demand per DPDCH of the jth TFC, which essentially takes account of the data rates, coding gains and transmission quality requirements of the data streams jointly transmitted in the relevant TFC.

The concrete calculation of the variables $K_{ref}$ and $K_j$ is likewise described in this case in the known specification "3rd Generation Partnership Project; Technical Specification Group Radio Access Network; Physical layer procedures (FDD), 3G TS 25.214 V3.2.0 (2000-03) (Release 1999), in particular Section 5.1.2.5.3 Computed gain factors". In this case, the influence of the coding gains and transmission quality requirements of an individual data stream No. i of the data streams transmitted jointly in the relevant TFC is expressed by a parameter $RM_i$, the so-called semi-static rate matching attribute. This parameter is typically signaled for each data stream.

This yields the amplification factors for the jth TFC by rounding in accordance with the following relationships: If $A_j$>1, then $\beta_{d,j}$=1.0 and $\beta_{c,j}=\lfloor 1/A_j \rfloor$, then $\lfloor \bullet \rfloor$ signifying rounding for the next lower quantized amplification factor. Since $\beta_{c,j}$ may not be set equal to zero, if the above rounding were to yield the value 0, $\beta_{c,j}$ is to be set to the lowest quantized amplification factor 0.0667, as specified in TS 25.213 of the source specified above. If $A_j$<1, then $\beta_{d,j}=\lceil A_j \rceil$ and $\beta_{c,j}$=1.0, $\lceil \bullet \rceil$ signifying rounding to the next higher quantized amplification factor. The quantized amplification factors are specified in "3rd Generation Partnership Project; Technical Specification Group Radio Access Network; Spreading and Modulation (FDD), 3G TS 25.213 V3.2.0 (2000-03) (Release 1999), Section 4.2.1, Table 1". The amplification factors, used in the compression mode, for a TFC are yielded from the amplification factors that are used in the normal mode for this TFC. A corrected nominal ratio $A_{c,j}$ is calculated for this purpose via the following relationship:

$$A_{C,j} = \frac{B_{d,j}}{B_{c,j}} \cdot \sqrt{\frac{15 \cdot N_{pilot,C}}{N_{slots,C} \cdot N_{pilot,N}}} ;$$

wherein $\beta_{c,j}$ and $\beta_{d,j}$: are the amplification factors for the jth TFC in the normal mode (signaled or calculated as described above); $N_{pilot,C}$: is the number of pilot bits per slot in the compression mode; $N_{pilot,N}$: is the number of pilot bits per slot in the normal mode; $N_{slots,C}$: is the number of slots in the compressed frame used for transmitting the data. $\beta_{c,C,j}$ and $\beta_{d,C,j}$, the amplification factors for the jth TFC in the compression mode, are then yielded by rounding in accordance with the following rules;

If $A_{C,j}$>1, then $\beta_{d,C,j}$=1.0 and $\beta_{c,C,j}=\lfloor 1/A_{C,j} \rfloor$, $\lfloor \bullet \rfloor$ signifying rounding to the next lower quantized amplification factor. Since $\beta_{c,C,j}$ may not be set to zero, if the above rounding were to yield the value 0, $\beta_{c,C,j}$ is to be set to the lowest quantized amplification factor 0.0667, as specified in TS 25.213 of the source specified above.

If $A_{C,j}$<1, then $\beta_{d,C,j}=\lceil A_{C,j} \rceil$ and $\beta$c,C,j=1.0, $\lceil \bullet \rceil$ signifying rounding to the next higher quantized amplification factor.

The quantized amplification factors are specified in "3rd Generation Partnership Project; Technical Specification Group Radio Access Network; Spreading and Modulation (FDD), 3G TS 25.213 V3.2.0 (2000-03) (Release 1999), Section 4.2.1, Table 1".

The disadvantage of this known method for calculating the amplification factor in the compression mode from calculated amplification factors in the normal mode resides in that the two-fold rounding or discredization carried out in the process firstly gives rise to a higher computational outlay and, secondly, the end result exhibits a relatively large error.

It is, therefore, an object of the present invention to specify a method, which is more accurate by comparison with the prior art and more favorable in terms of outlay, for determining the amplification factors both of a data channel and of a control channel of a data transmission system.

SUMMARY OF THE INVENTION

Thus, according to the present invention, in the compression mode a corrected nominal ratio ($A_{c,j}$) is calculated from the nominal ratio ($A_j$) (instead of from the amplification factors used in the normal mode, as in the prior art), and amplification factors ($\beta_{c,C,j}$, $\beta_{d,C,j}$) are determined therefrom via rounding. Instead of "rounding", the term "discretization" or "quantization" is also apt or suitable, depending on the value range of the amplification factors.

Consequently, the present invention is based on the idea of keeping as small as possible the disadvantage, resulting from the rounding or quantization of the amplification factors, of an inaccurate power setting, this being done by carrying out the unavoidable rounding or quantization, particularly at one point in the overall method, in such a way that as low an inaccuracy as possible is achieved.

In this case, the present invention can be applied in particular, whenever reference amplification factors are signaled or used in the normal mode instead of amplification factors. In the case of the signaling of amplification factors in normal mode, the amplification factors in the compression mode are also advantageously based on these signaled amplification factors.

Consequently, instead of successively carrying out two rounding operations as is provided in the prior art, only one rounding operation is carried out to determine an amplification factor in the compression mode, as a result of which the required computational complexity is reduced and the calculated amplification factors generally exhibit a higher accuracy.

Additional features and advantages of the present invention are described in, and will be apparent from, the following Detailed Description of the Invention.

DETAILED DESCRIPTION OF THE INVENTION

A preferred design of the present invention provides for performing in the normal mode either a signaling or a calculation, which includes a rounding operation, in particular, of the amplification factors of a data channel and/or a control channel. If a signaled amplification factor ($\beta_{c,j}$, $\beta_{d,j}$) is used, for example, in the normal mode, then the corresponding amplification factor ($\beta_{c,C,j}$, $\beta_{d,C,j}$) in the compression mode is also yielded from the signaled amplification factors ($\beta_{c,j}$, $\beta_{d,j}$) of the normal mode via a correction calculation. If, however, use is made of amplification factors ($\beta_{c,j}$, $\beta_{d,j}$), calculated in the normal mode, that are calculated, in particular, from signaled reference amplification factors, the corresponding amplification factor ($\beta_{c,C,j}$, $\beta_{d,C,j}$) is not yielded in the compression mode from these calculated amplification factors of the normal mode by a correction calculation, but from a calculated nominal ratio ($A_j$); in particular, via a correction calculation of the nominal ratio ($A_j$) with subsequent rounding or discretization of the corrected nominal ratio ($A_{C,j}$) resulting from this correction. The nominal ratio ($A_j$) is calculated in this case from signaled reference amplification factors, in particular. The invention is described in more detail below with the aid of a preferred exemplary embodiment.

If the amplification factors $\beta_c$ and $\beta_d$ are signaled in the normal mode, their determination is performed in the compression mode in accordance with the prior art.

If the amplification factors are calculated in normal mode for specific TFCs from the nominal ratio $A_j$, and thus from reference amplification factors, via the relationship $$A_j = \frac{\beta_{d,ref}}{\beta_{c,ref}} \cdot \sqrt{\frac{L_{ref}}{L_j} \sqrt{\frac{K_j}{K_{ref}}}}$$

and subsequent rounding (see above), then (otherwise than in the prior art) the amplification factors are determined in the compression mode not from the amplification factors of the normal mode, but as a function of the nominal ratio $A_j$ determined in the normal mode. In the compression mode, the amplification factors $\beta_{c,C,j}$ and $\beta_{d,C,j}$ are then determined not from the rounded amplification factors of the normal mode, but from a corrected nominal ratio $$A_{C,j} = A_j \cdot \sqrt{\frac{15 \cdot N_{pilot,C}}{N_{slots,C} \cdot N_{pilot,N}}}$$

wherein $A_j$: is the nominal ratio in the normal mode; $N_{pilot,C}$: is the number of pilot bits per slot in the compression mode; $N_{pilot,N}$: is the number of pilot bits per slot in the normal mode; and $N_{slots,C}$: is the number of slots in the compressed frame that are used for transmitting the data. $\beta_{c,C,j}$ and $\beta_{d,C,j}$, the amplification factors for the jth TFC in the compression mode, are then yielded by rounding in accordance with the following rules:

If $A_{C,j} > 1$, then $\beta_{d,C,j} = 1.0$ and $\beta_{c,C,j} = \lfloor 1/A_{C,j} \rfloor$, $\lfloor \cdot \rfloor$ signifying rounding to the next lower quantized amplification factor. Since $\beta_{c,C,j}$ may not be set to zero, if the above rounding were to yield the value 0, $\beta_{c,C,j}$ is to be set to the lowest quantized amplification factor 0.0667, as specified in TS 25.213 of the source specified above.

If $A_{C,j} < 1$, then $\beta_{d,C,j} = \lceil A_{C,j} \rceil$ and $\beta_{c,C,j} = 1.0$, $\lceil \cdot \rceil$ signifying rounding to the next higher quantized amplification factor.

The quantized amplification factors are specified in "3rd Generation Partnership Project; Technical Specification Group Radio Access Network; Spreading and Modulation (FDD), 3G TS 25.213 V3.2.0 (2000-03) (Release 1999), Section 4.2.1, Table 1".

Although the present invention as described with reference to specific embodiments, those of skill in the art will recognize that changes may be made thereto without departing from the spirit and scope of the present invention as set forth in the appended claims.

The invention claimed is:

1. A method for determining amplification factors of a data channel and of a control channel of a data transmission system, the method comprising the steps of:
performing data transmission in one of a normal mode and a compression mode;
calculating a nominal ratio ($A_j$) in the normal mode from signaled reference amplification factors ($\beta_{c,ref}$, $\beta_{d,ref}$);
determining amplification factors ($\beta_{c,j}$, $\beta_{d,j}$) from the nominal ratio via one of rounding and discretization;
calculating a corrected nominal ratio ($A_{C,j}$) from the calculated nominal ratio ($A_j$) in the compression mode without using the amplification factors ($\beta_{c,j}$, $\beta_{d,j}$) determined from the nominal ratio via one of rounding and discretization; and
determining amplification factors ($\beta_{c,C,j}$, $\beta_{d,C,j}$) from the corrected nominal ratio via one of rounding and discretization, wherein the amplification factors are used for avoiding inaccurate power settings in the data transmission system.

2. The method for determining amplification factors of a data channel and of a control channel of a data transmission system as claimed in claim 1, wherein the nominal ratio ($A_j$) is calculated by:

$$A_j = \frac{\beta_{d,ref}}{\beta_{c,ref}} \cdot \sqrt{\frac{L_{ref}}{L_j} \sqrt{\frac{K_j}{K_{ref}}}},$$

wherein:
$\beta_{c,ref}$, $\beta_{d,ref}$: are signaled reference amplification factors for a reference TFC;
$\beta_{c,j}$, $\beta_{d,j}$: are amplification factors for a jth TFC;
$L_{ref}$: is a number of DPDCHs used for the reference TFC;
$L_j$: is a number of DPDCHs used for the jth TFC;
$K_{ref}$: is a measure of power demand per DPDCH of the reference TFC, which substantially accounts for data rates, coding gains and transmission quality requirements of data streams jointly transmitted in the relevant TFC;
$K_j$: is a measure of power demand per DPDCH of the jth TFC, which substantially accounts for the data rates, coding gains and transmission quality requirements of the data streams jointly transmitted in the relevant TFC.

3. A method for determining amplification factors of a data channel and of a control channel of a data transmission system as claimed in claim 1, wherein the corrected nominal ratio ($A_{C,j}$) is calculated by:

$$A_{C,j} = A_j \cdot \sqrt{\frac{15 \cdot N_{pilot,C}}{N_{slots,C} \cdot N_{pilot,N}}},$$

wherein
$A_j$: is the nominal ratio in the normal mode;
$N_{pilot,C}$: is a number of pilot bits per slot in the compression mode;
$N_{pilot,N}$: is a number of pilot bits per slot in the normal mode; and
$N_{slot,C}$: is a number of slots in a compressed frame used for transmitting the data.

* * * * *